Patented Sept. 2, 1947

2,426,836

UNITED STATES PATENT OFFICE 2,426,836

NONCAKING LAUNDRY SOUR COMPOSITION

Lowell Russell McCoy, Detroit, Mich., assignor to Wyandotte Chemicals Corporation, Wyandotte, Mich., a corporation of Michigan No Drawing. Application June 26, 1943,
Serial No. 492,469

1 Claim. (Cl. 252—136)

The present invention relates to preventing caking of mixtures of commercial nitre cake in which mixture there is present either an acid or a basic material, or both, tending to react with components of the nitre cake in the presence of water.

In such mixtures as laundry sours there are frequently present, such materials as phosphates or fluorides or other basic or acidic materials which tend to react with the alkali metal acid sulfate in the presence of water. For example, when sodium acid fluoride is present, hydrofluoric acid is generated. This may be explained according to the following equation:

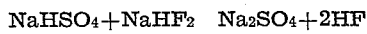
$$NaHSO_4 + NaHF_2 \rightarrow Na_2SO_4 + 2HF$$

Ground nitre cake is hydroscopic and when this aforesaid composition is packaged or placed in a glass vessel under conditions that moisture is adsorbed from the atmosphere or is already present in one or more of the components, it etches the glass.

Numerous attempts have been made to overcome the difficulty of agglomeration or hardening of nitre cake and mixtures containing the same. One patent in the twenties mentions that prior to that time, the addition of powdered calcium compounds and powdered talc had been tried. But so far as applicant knows, none of these prior efforts where additives have been used have been successful. Applicant has in fact tried incorporating such powdered reagents as calcium phosphate, tetrasodium pyrophosphate, calcium carbonate, soda ash, corn and rice starches and dextrine with laundry sours containing nitre cake, but with little or no effectiveness.

I have now found that powdered laundry sours containing nitre cake can be kept in a condition that they flow freely by the addition of but small amounts of finely powdered zinc oxide or zinc carbonate, preferably the former. Zinc oxide has a more pronounced effect than the carbonate.

Zinc oxide has additional advantages to those set out supra when employed in solid detergent or cleaning materials. It dissolves completely in a water solution of the sour; this takes place rapidly when the solution is hot and slowly in the cold. This is not true of magnesium carbonate, calcium carbonate, talc or the starches. The first two of these form insoluble magnesium and calcium fluorides respectively with the sodium bifluoride. This would not only be a handicap in marketing but also in employing the sour. Starches exhibit darkening when the sour is maintained for any extended period of time at temperatures around 127° F., as in warehouses in southern regions in the summer months.

It is, of course, necessary that the additive be well mixed with the components of the sour. It is preferred to first intimately mix the ground nitre cake with the zinc oxide or zinc carbonate and then incorporate this admixture with sodium tetraphosphate and sodium bifluoride; but the order can be rearranged. Other alkaline salts other than sodium tetraphosphate can be employed, such as sodium hexametaphosphate or tetrasodium pyro phosphate. These are the more commonly used water-softening phosphates, and it will be noted that their $Na_2O$ to $P_2O_5$ mol ratios occur in the range of 1:1 to 2:1. And other acidic salts other than sodium acid fluoride can be used such as sodium silicofluoride, ammonium silicofluoride and ammonium bifluoride. The corresponding potassium salts can be used instead of the sodium and ammonium salts.

The per cent range of effectiveness is variable but the degree of protection is a function of the per cent of zinc oxide or zinc carbonate present. Additions of less than 1% (based upon the weight of sour and additive) up to and including 5% secure improvement in the physical state of a laundry sour containing 5% sodium tetraphosphate, 50% nitre cake and 45% sodium bifluoride. The requisite amount will depend somewhat upon the ratio of components comprising the sour and the moisture content of the original mixture. Moreover, the effective amount has been found to depend upon the length of time the laundry sour is kept in storage. I have found that for storing a sour (having the composition set out in the example herein) for a few days only, the addition of 0.5 to 0.75% ZnO maintains the mixture in a free flowing condition. The mixture then begins to knit and becomes somewhat harder after prolonged periods of time. With 2% of the additive the free flowing condition is maintained over a period of weeks. 1% ZnO produces results intermediate between 0.75 and 2% but this amount has proven entirely satisfactory in commercial practice. With 5% of this additive, the sour remained free flowing for a longer period than with these respective small amounts. The addition of ZnO further tends to eliminate the odor of chlorine which results from the reaction between oxidizing material in the nitre cake and salt in the bifluoride, both of which are commonly found as impurities in these materials.

In examples below the sour employed had the composition of 5% sodium tetraphosphate, 50% nitre cake and 45% sodium bifluoride. The following examples serve to illustrate the invention.

Example I

Tests made upon 25 pound lots of the same sour, revealed that after storing for three weeks, the batches containing 1% and 2½% zinc oxide respectively, were in far better physical condition than the check lot containing no zinc oxide.

Example II

Tests were made upon two 300 pound barrels of sour comprising these three components. The nitre cake thereof was crude fines from a large chemical manufacturer and analyzed 1.25% moisture. To the sour in the first barrel 1% of zinc oxide was well incorporated. The second barrel was a check. After one week, the barrels were opened. The regular sour was hard. The sour containing the 1% zinc oxide was quite soft, although it had knitted somewhat. However, it was very easily scooped and the material once broken was very free flowing as contrasted to the more granular appearance of the check lot. The check batch smelled of chlorine, whereas the treated batch gave no chlorine odor.

Example III

Two samples of the sour of the composition aforesaid were made up in amounts of 100 grams, to one of which 2 grams of zinc carbonate was added and the other was used as a check, both samples being placed in glass bottles. The addition of the zinc carbonate served to prevent the etching of the glass bottle. The bottle containing the check sample exhibited pronounced etching in the corresponding period of time. After two days both bottles were opened. The treated sour had caked slightly but was more easily broken up than the sour serving as the check sample.

It is believed that the explanation of the effectiveness of the addition of powdered zinc-oxide is that the zinc oxide de-activates the surface of the nitre particles or of all of the three components. It is thought that the condition is one of slight reaction of this additive with the surface of the nitre cake particles or possibly other of the components forming films which are inert to contiguous surfaces. Hence, the nitre cake cannot react with the sodium bifluoride when moisture is present. While this is the theory, I do not of course, intend to be restricted in any sense to the soundness or accuracy of theories which I have advanced as to the advantageous results obtained. But the problem of preventing caking of sours is different and more complex than preventing setting of nitre cake alone.

While I have in the foregoing described in some detail the preferred embodiments of my invention and some variants thereof, it is to be understood that I do not intend my invention to be limited to the details herein described. On the other hand, it is my intention to claim all novelty herein disclosed as broadly as possible in view of the prior art.

I claim as my invention:

A non-caking laundry sour composition in which the tendency of the ingredients to react and form hydrofluoric acid on storing is inhibited, comprising by weight, 50% nitre cake, 45% sodium bifluoride, 5% sodium tetraphosphate, and 1 to 2½% by weight of an addition to the total weight of said ingredients of zinc oxide.

LOWELL R. McCOY.

REFERENCES CITED

The following references are of record in the file of this patent:

UNITED STATES PATENTS

| Number | Name | Date |
| --- | --- | --- |
| 1,312,783 | Galt | Aug. 12, 1919 |
| 1,434,551 | McAdam et al. | Nov. 7, 1922 |
| 1,599,996 | Fritz | Sept. 14, 1926 |
| 2,069,710 | Missbach | Feb. 2, 1937 |
| 2,092,913 | Fiske | Sept. 14, 1937 |
| 2,331,396 | Humbaugh et al. | Oct. 12, 1943 |

FOREIGN PATENTS

| Number | Country | Date |
| --- | --- | --- |
| 449,275 | Great Britain | June 24, 1936 |